(12) United States Patent
Ostrom

(10) Patent No.: US 6,254,018 B1
(45) Date of Patent: Jul. 3, 2001

(54) ALIGNMENT CONTROL FOR LONG CENTER PIVOT IRRIGATION SYSTEMS

(75) Inventor: Carl R. Ostrom, Omaha, NE (US)

(73) Assignee: Valmont Industries, Inc., Valley, NE (US)

(*) Notice: Subject to any disclaimer, the term of this patent is extended or adjusted under 35 U.S.C. 154(b) by 0 days.

(21) Appl. No.: 09/465,090

(22) Filed: Dec. 16, 1999

(51) Int. Cl.⁷ ........................................................ B05B 3/12
(52) U.S. Cl. ........................ 239/731; 239/733; 239/69; 701/50; 701/215
(58) Field of Search .................... 239/67, 69, DIG. 15, 239/722, 723, 726, 728–733; 701/50, 213, 214, 215; 342/357.08, 357.17; 405/37; 180/168, 204, 400, 401

(56) References Cited

U.S. PATENT DOCUMENTS

| | | | |
|---|---|---|---|
| 3,802,627 | 4/1974 | Seckler et al. | 239/729 |
| 4,011,990 | 3/1977 | Meis et al. | 239/11 |
| 4,340,183 | 7/1982 | Kegel et al. | 239/729 |
| 4,569,481 | 2/1986 | Davis et al. | 239/729 |
| 4,790,402 | 12/1988 | Field et al. | 180/169 |
| 5,155,684 | 10/1992 | Burke et al. | 701/25 |
| 5,334,987 | 8/1994 | Teach | 701/214 |
| 5,610,815 | 3/1997 | Gudat et al. | 701/23 |
| 5,653,389 | 8/1997 | Henderson et al. | 239/69 |
| 5,657,226 | 8/1997 | Shin et al. | 180/167 X |
| 5,870,686 | 2/1999 | Monson | 701/1 |
| 5,904,296 | 5/1999 | Doherty et al. | 239/61 |
| 5,919,242 | 7/1999 | Greatline et al. | 701/50 |
| 5,927,603 | 7/1999 | McNabb | 239/63 |
| 5,955,973 | 9/1999 | Anderson | 340/988 |
| 6,045,066 * | 4/2000 | Gerdes et al. | 239/729 |
| 6,095,439 * | 8/2000 | Segal et al. | 239/729 |

OTHER PUBLICATIONS

Gerald W. Buchleiter, et al. "Performance of Nondifferential GPS to Determine Sprinkler Position", dated 1998.

* cited by examiner

Primary Examiner—David Bagnell
Assistant Examiner—Sunil Singh
(74) Attorney, Agent, or Firm—Zarley, McKee, Thomte, Voorhees & Sease; Dennis L. Thomte

(57) ABSTRACT

An alignment control is provided for long center pivot irrigation systems which include a center pivot structure having an elongated water pipe extending outwardly therefrom with the water pipe being supported upon a plurality of drive units which propel the water pipe around the center pivot structure. A first GPS control is positioned on the center pivot structure which functions as a stationary reference. A second GPS control is positioned on the center drive unit near the center length of the water pipe. A third GPS control is mounted on the last or outermost drive unit. A computer-operated control is operatively connected to the drive motor on the center drive unit. The first, second and third GPS controls are operatively connected to the computer-operated control which computes an approximate straight line between the center pivot structure and the last drive unit and which selectively operates the drive motor on the center drive unit so that the center drive unit will be positioned within some tolerance of the approximate straight line between the center pivot structure and the last drive unit.

7 Claims, 2 Drawing Sheets

ALIGNMENT CONTROL FOR LONG CENTER PIVOT IRRIGATION SYSTEMS

BACKGROUND OF THE INVENTION

1. Field of the Invention

This invention relates to a center pivot irrigation system and more particularly to an alignment control for long center pivot systems.

2. Description of the Related Art

Conventional center pivot irrigation systems comprise an elongated water pipe pivotally connected at its inner end to a center pivot structure and extending outwardly therefrom. The water pipe of the conventional center pivot system is comprised of a plurality of pipes connected together in an end-to-end fashion which are supported upon a plurality of drive units. Each of the drive units may be propelled by an electric motor, a hydraulic motor or an air motor, with electric motors being the most popular and widely used source of propulsion. Normally, the outermost drive unit or last drive unit is the master unit with the other drive units being selectively driven in response to angular displacement of the pipe section adjacent thereto.

The machine alignment on the center pivot system is maintained by a mechanical linkage at each drive unit span joint, which operates a micro-switch, which in turn starts and stops the electric motor on the drive unit to keep it alignment with the next span. The alignment control works well on most machines, up to approximately 1,500 feet in length, but does not always maintain good alignment on longer systems. The reason for the problem on long systems is that small changes in alignment at a number of drive units on the system can cause a large change in the overall system alignment. If the alignment gets bad enough, it can cause structural damage to the system. These small changes in alignment are causes by external forces such as the drive unit crossing crop furrows at an angle, strong wind blowing on the spans, or temperature changes in the micro-switches and linkages.

SUMMARY OF THE INVENTION

An alignment control is provided for long center pivot systems having an elongated water pipe extending outwardly from a center pivot structure with the water pipe being supported upon a plurality of drive units which propel the water pipe around the center pivot structure. Each of the drive units includes a drive means such as an electric motor which is actuated by a mechanical linkage at each drive unit span joint, which operates a micro-switch, which in turn starts and stops the electric motor on the drive unit to keep it in line with the next span. A first GPS control is provided at the center pivot structure which functions as a stationary reference. A second GPS control is positioned on the center drive unit near the center length of the water pipe. A third GPS control is mounted on the outermost or last drive unit. A computer-operated control system is operatively connected to the center drive unit where the second GPS control is located. The first, second and third GPS controls are operatively connected to the computer-operated control system. The computer-operated control system computes an approximate straight line between the center pivot structure and the last drive unit and selectively operates the drive means on the center drive unit so that the center drive unit will be positioned or maintained within some tolerance of the approximate straight line between the center pivot structure and the last drive unit. The computer-operated control system may continuously compute the approximate straight line or periodically compute the approximate straight line. As stated, the center drive unit includes an alignment control which normally controls the movement of the center drive unit. The computer-operated control system may override the alignment control on the center drive unit when the position of the center drive unit exceeds some tolerance from the approximate straight line. The irrigation system may further include a system control for stopping all of the drive units when the last drive unit has reached the predetermined position. The irrigation system may further include a system control for reversing the direction of the irrigation system when the last drive unit has reached a predetermined position in the field. Further, the irrigation system may include a selectively operable end gun sprinkler at the outer end of the water pipe which is actuated when the last drive unit reaches a predetermined position in the field and which deactuates the end gun sprinkler when the last drive unit has reached a particular position in the field.

It is therefore a principal object of the invention to provide an improved alignment control for long center pivot irrigation systems.

Still another object of the invention is to provide an alignment control for long center pivot irrigation systems wherein a first GPS control is mounted on the pivot point as a stationary reference, a second GPS control is mounted on the last drive unit, and a third GPS control is mounted on a drive unit near the center of the system, and wherein the GPS controls and associated computer controls continuously or periodically compute a straight line between the pivot point and the last drive unit with the control system operating the drive unit near the center of the system so that it stays within some tolerance of the straight line between the pivot and the last drive unit.

Still another object of the invention is to provide an alignment control for long center pivot irrigation systems which may control the drive unit near the center of the system all the time or which may be used to override the standard alignment when the position of the center drive unit exceeds some tolerance from the straight line.

Still another object of the invention is to provide an alignment control for long center pivot irrigation systems which provides the added benefit of always knowing the exact position of the last drive unit for controlling such things as end guns, changing directions, or stopping the machine.

These other objects will be apparent to those skilled in the art.

DESCRIPTION OF THE PREFERRED EMBODIMENT

Figure 1:
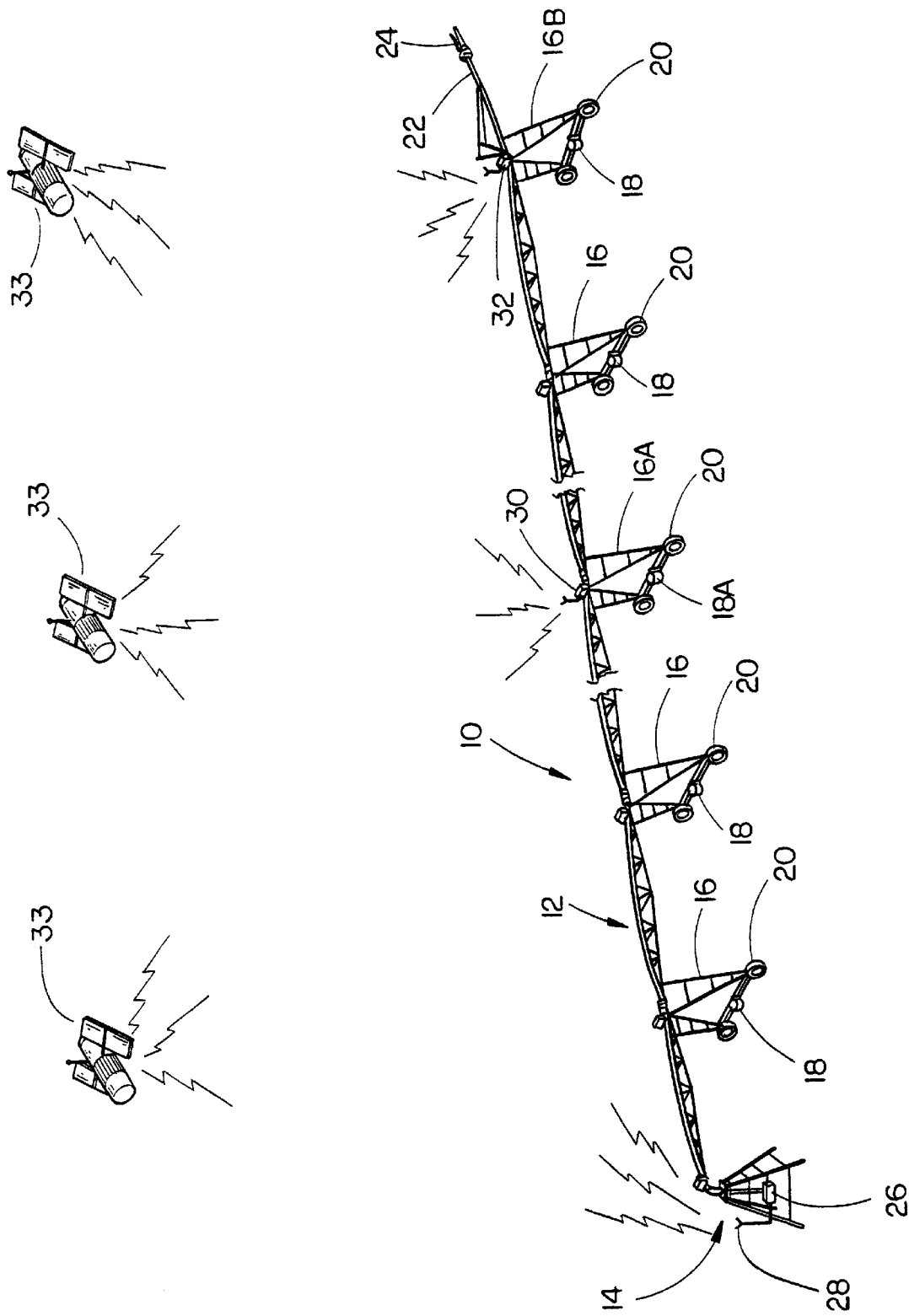
FIG. 1 is a perspective view of a center pivot irrigation system.
Figure 2:
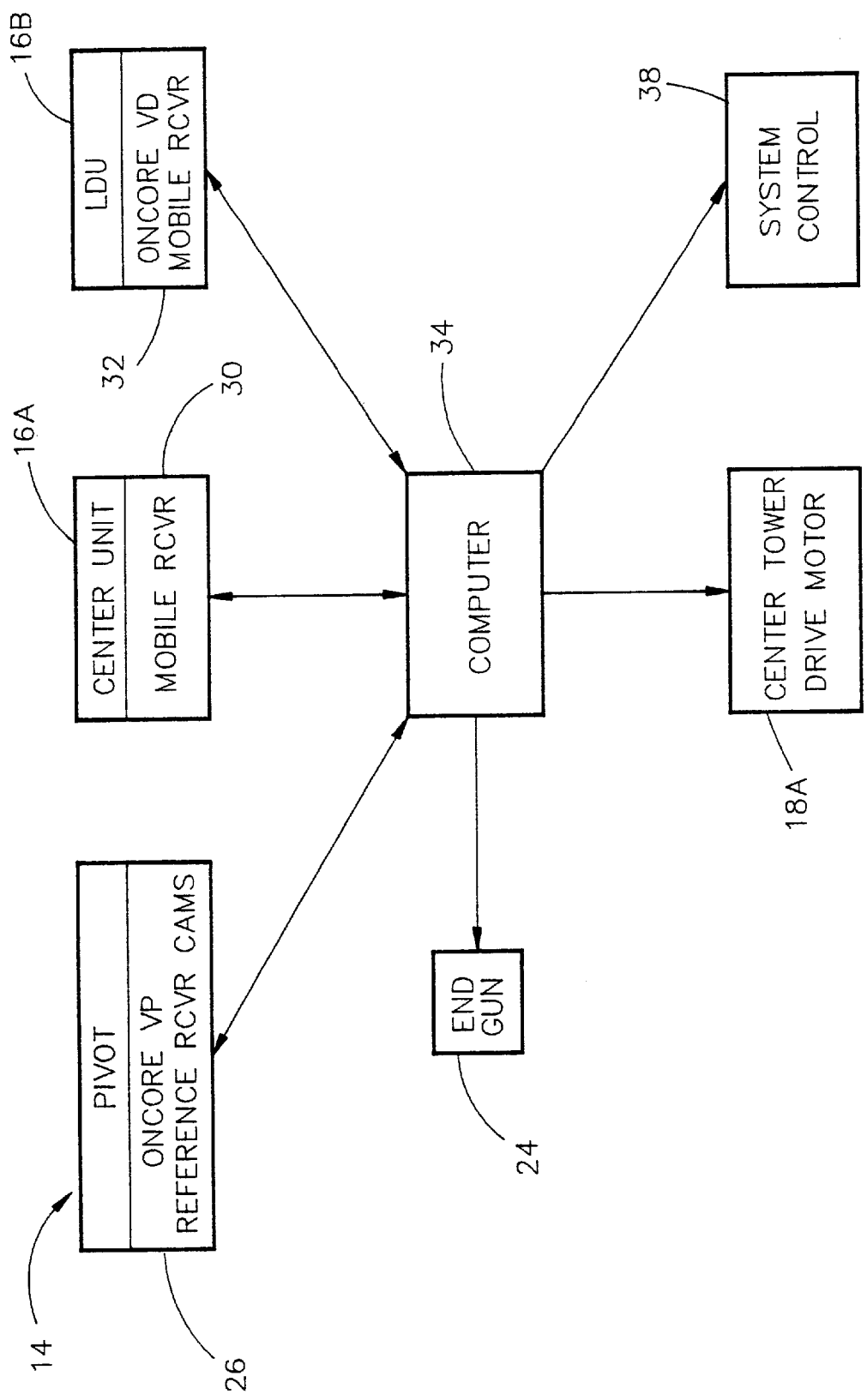
FIG. 2 is a block diagram illustrating the alignment control.

The numeral 10 refers generally to a self-propelled center pivot irrigation system which includes a water conduit, pipe or boom 12 which extends outwardly from a conventional center pivot structure 14. Water pipe 12 is comprised of a plurality of pipe sections joined together in an end-to-end relationship which are supported upon a plurality of drive units 16, each of which have a drive means 18 for propelling the wheels 20 thereof. In most cases, the drive means 18 will comprise an electric motor which may be reversible so that the system may be driven in either a forward direction or a reverse direction. Normally, the machine alignment on the center pivot system is maintained by a mechanical linkage at each drive unit span joint, which operates a micro-switch, which in turn starts and stops the electric motor on the drive unit to keep it in line with the next span. For purposes of description, the drive unit 16 which is located at the approximate center of the system will be designated by the reference numeral 16A. The last drive unit on the system will be designated by the reference numeral 16B. Normally, a cantilevered boom 22 extends outwardly from the last drive unit and has an end gun 24 mounted thereon which is actuated to irrigate areas outside the area covered by the water pipe between the center pivot structure and the last drive unit.

A GPS control 26 is positioned on the center pivot structure 14 and would normally include an antenna 28. GPS control 26 serves as a stationary reference for the system. One type of GPS control which will satisfactorily perform the intended function is an Oncore VP reference receiver, although other types of GPS controls will function satisfactorily. In most cases, the GPS control 26 will include an embedded computer.

A GPS control 30 is positioned on the center drive unit 16A and may be comprised of an Oncore VP mobile receiver of conventional design. A GPS control 32 is mounted on the last drive unit 16B and may also be an Oncore VP mobile receiver of conventional design. The GPS controls 26, 30 and 32 communicate with satellites 33 in conventional fashion.

The numeral 34 refers to a conventional computer control which is connected to the GPS control 26, GPS control 30, GPS control 32, and the drive motor 18A on center drive unit 16A which is normally controlled by the conventional alignment control. Computer control 34 is preferably connected to a conventional system control for stopping or reversing the system and which is referred to generally by the reference numeral 38. Computer control 34 will either stop the system or reverse the system when the last drive unit 16B has reached a predetermined position within the field being irrigated. Preferably, computer control 34 is also connected to the end gun 24 for actuating the end gun 24 when the last drive unit 16B has reached a predetermined position within the field being irrigated and for deactuating end gun 24 when the last drive unit 16B has reached a predetermined position in the field. The GPS control 32 which is mounted on the last drive unit 16B enables the position of the last drive unit 16B to be precisely determined so that the system may be either stopped or reversed or so that the end gun 24 may be actuated or deactuated.

The computer-operated control system 34 computes an approximate straight line between the center pivot structure 14 and the last drive unit 16B and will then operate the drive motor 18A on the center drive unit 16A so that the center drive unit 16A will be positioned within some tolerance of the approximate straight line between the center pivot structure 14 and the outermost drive unit 16B. The computer control may continuously compute the approximate straight line or may compute the approximate straight line periodically. The computer control 34 may control the operation of the drive motor 18A continuously or may be used to simply override the conventional alignment control.

Thus it can be seen that an alignment control has been provided for long center pivot irrigation systems to maintain the long system in a substantially straight line, regardless of field conditions, wind conditions, temperature conditions, etc.

Thus it can be seen that the invention accomplishes at least all of its stated objectives.

I claim:

1. An irrigation system, comprising:

a center pivot support structure;

an elongated water pipe, having inner and outer ends, pivoted at its inner end to said center pivot support structure and extending outwardly therefrom;

said water pipe supported upon a plurality of drive units which propel said water pipe around said center pivot structure;

each of said drive units including a drive means;

a first GPS control at said center pivot structure which functions as a stationary reference;

a second GPS control on one of said drive units near the center length of said water pipe;

a third GPS control on the outermost drive unit;

a computer-operated control system operatively connected to said drive means on the said one drive unit where said second GPS control is located;

said first, second and third GPS controls being operatively connected to said computer-operated control system;

said computer-operated control system computing an approximate straight line between said center pivot structure and said outermost drive unit and selectively operating said drive means on the said one drive unit where said second GPS control is located so that said one drive unit where said second GPS control is located will be positioned within some tolerance of the said approximate straight line between the said center pivot structure and the said outermost drive unit.

2. The irrigation system of claim 1 wherein said computer-operated control system continuously computes said approximate straight line.

3. The irrigation system of claim 1 wherein said computer-operated control system periodically computes said approximate straight line.

4. The irrigation system of claim 1 wherein said one drive unit where said second GPS control is located includes an alignment control which normally controls the movement of said one drive unit where said second GPS control is located and wherein said computer-operated control system overrides said alignment control when the position of said one drive unit where said second GPS control is located exceeds some tolerance from the said approximate straight line.

5. The irrigation system of claim 1 further including a system control for stopping all of said drive units and wherein said third GPS control is operatively connected to said system control for ascertaining the position of said outermost drive unit so that said system control will stop all of said drive units when said outermost drive unit has reached a predetermined position.

6. The irrigation system of claim 1 further including a system control for reversing the direction of the irrigation system and wherein said third GPS control is operatively connected to said system control for ascertaining the position of said outermost drive unit so that said system control will reverse all of said drive units when said outermost drive unit has reached a predetermined position.

7. The irrigation system of claim 1 further including a selectively operable end gun sprinkler at the outer end of said water pipe and wherein said computer-operated control system is operatively connected to said end gun sprinkler for activating said end gun sprinkler when said outermost drive unit reaches a predetermined position and for deactuating said end gun sprinkler when said outermost drive unit reaches a predetermined position.

\* \* \* \* \*